(12) United States Patent
Binder et al.

(10) Patent No.: US 9,400,038 B2
(45) Date of Patent: Jul. 26, 2016

(54) CAMSHAFT WITH AN AXIALLY DISPLACEABLE CAM PACK

(75) Inventors: Thomas Binder, Feldkirch (AT); Peter Wiesner, Mauren (LI)

(73) Assignee: ThyssenKrupp Presta TecCenter AG, Eschen (LI)

( * ) Notice: Subject to any disclaimer, the term of this patent is extended or adjusted under 35 U.S.C. 154(b) by 194 days.

(21) Appl. No.: 14/130,230

(22) PCT Filed: Jun. 29, 2012

(86) PCT No.: PCT/EP2012/062722
§ 371 (c)(1),
(2), (4) Date: Feb. 21, 2014

(87) PCT Pub. No.: WO2013/001069
PCT Pub. Date: Jan. 3, 2013

(65) Prior Publication Data
US 2014/0165776 A1    Jun. 19, 2014

(30) Foreign Application Priority Data

Jun. 30, 2011 (DE) .......................... 10 2011 051 480

(51) Int. Cl.
| | |
|---|---|
| *F16H 25/10* | (2006.01) |
| *B21D 53/84* | (2006.01) |
| *F01L 1/047* | (2006.01) |
| *F16H 53/02* | (2006.01) |
| *B22D 19/00* | (2006.01) |
| *F16H 25/08* | (2006.01) |
| *F01L 1/34* | (2006.01) |
| *F01L 13/00* | (2006.01) |

(52) U.S. Cl.
CPC .............. *F16H 25/10* (2013.01); *B21D 53/845* (2013.01); *B22D 19/00* (2013.01); *F01L 1/047* (2013.01); *F01L 1/34* (2013.01); *F16H 25/08* (2013.01); *F16H 53/025* (2013.01); *F01L 2001/0473* (2013.01); *F01L 2013/0052* (2013.01); *Y10T 29/49293* (2015.01); *Y10T 74/2101* (2015.01); *Y10T 74/2102* (2015.01)

(58) Field of Classification Search
CPC .............. F01L 1/047; F01L 2001/0473; F01L 2013/0052; F16H 25/10; F16H 53/025; Y10T 74/2102; Y10T 29/49293; Y10T 74/2101
See application file for complete search history.

(56) References Cited

U.S. PATENT DOCUMENTS

| | | | |
|---|---|---|---|
| 7,513,232 | B2 | 4/2009 | Schneider |
| 8,607,749 | B2 | 12/2013 | Bechtold |

(Continued)

FOREIGN PATENT DOCUMENTS

| | | |
|---|---|---|
| CH | 694277 A5 | 10/2004 |
| DE | 9313056 U1 | 11/1993 |

(Continued)

*Primary Examiner* — Thomas Diaz
(74) *Attorney, Agent, or Firm* — Laurence A. Greenberg; Werner H. Stemer; Ralph E. Locher

(57) ABSTRACT

A camshaft includes a carrier shaft to be mounted rotatably along a shaft axis and at least one cam pack or package axially displaceably disposed on the carrier shaft. The cam pack includes at least two cams and at least one adjusting member for axial adjustment of the cam pack. The cams and the at least one adjusting member are connected to one another in an axially adjacent configuration and can be mounted axially displaceably as a composite structure in a direct configuration on the carrier shaft by a rolling element guide with rolling elements. A cam pack or package and a method for producing a camshaft are also provided.

12 Claims, 5 Drawing Sheets

(56) References Cited

U.S. PATENT DOCUMENTS

| | | |
|---|---|---|
| 2012/0138001 A1 | 6/2012 | Werler et al. |
| 2013/0000442 A1 | 1/2013 | Wiesner et al. |

FOREIGN PATENT DOCUMENTS

| | | | |
|---|---|---|---|
| DE | 102007022145 A1 | 1/2008 | |
| DE | 102007056692 A1 * | 5/2009 | ............. F01L 1/047 |
| DE | 102008064340 A1 | 6/2010 | |
| DE | 102009022657 A1 | 1/2011 | |
| DE | 102009055868 A1 | 6/2011 | |
| DE | 102010004579 A1 | 7/2011 | |
| DE | 102010060766 A1 | 5/2012 | |
| EP | 0723094 A2 | 7/1996 | |
| EP | 1754913 A2 | 2/2007 | |
| WO | 2008012306 A1 | 1/2008 | |
| WO | 2011018075 A2 | 2/2011 | |
| WO | 2011072782 A1 | 6/2011 | |

* cited by examiner

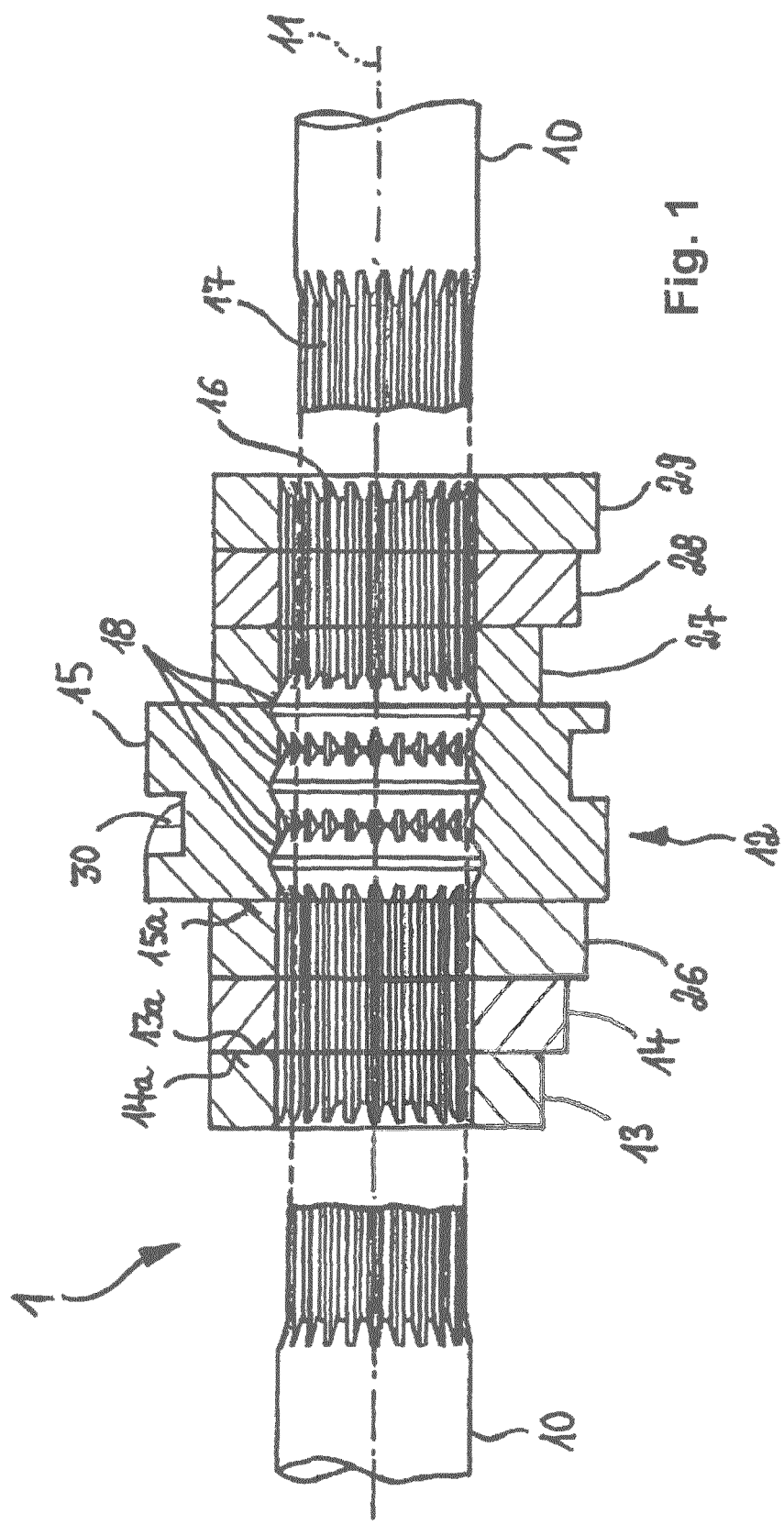

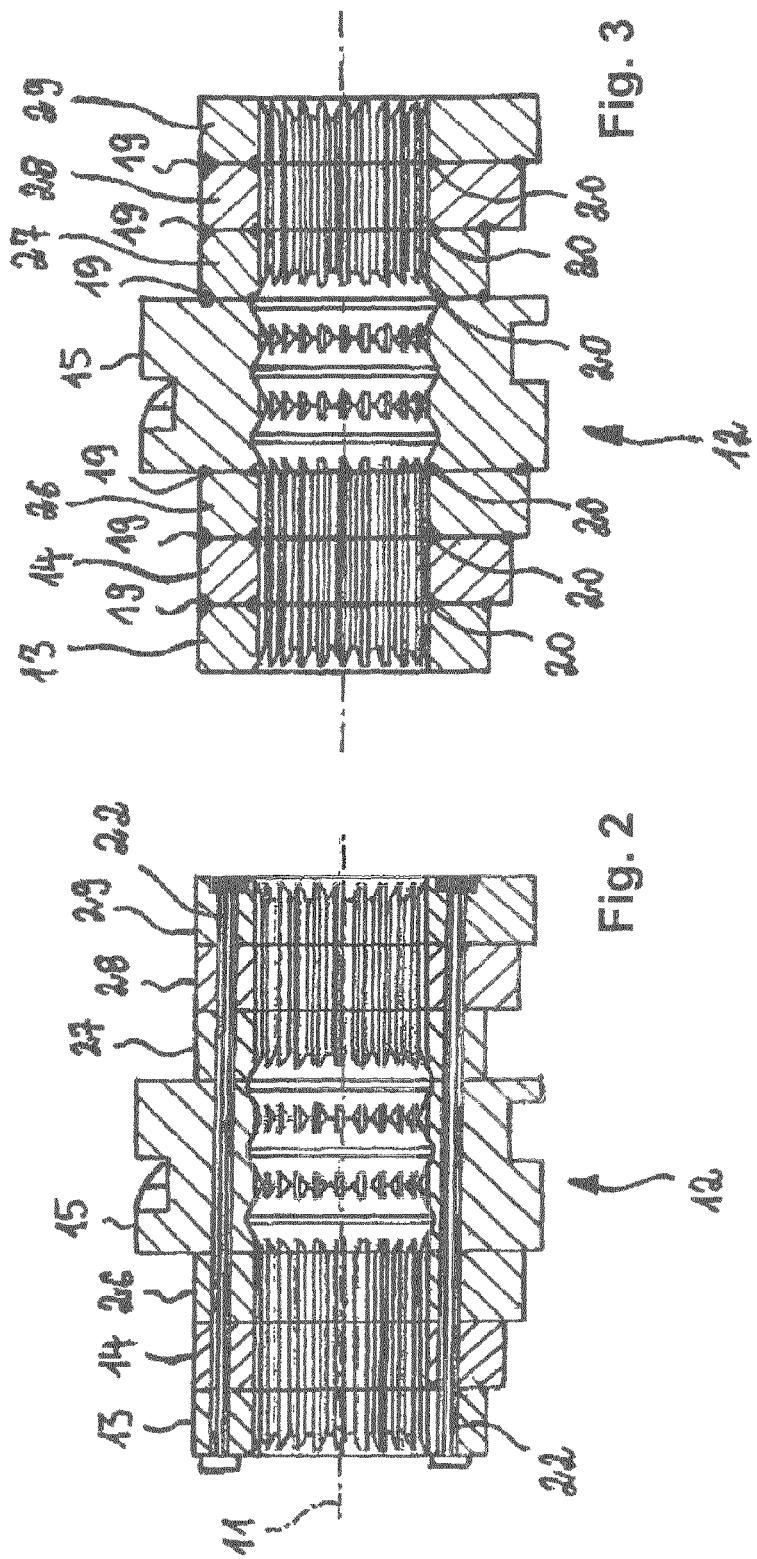

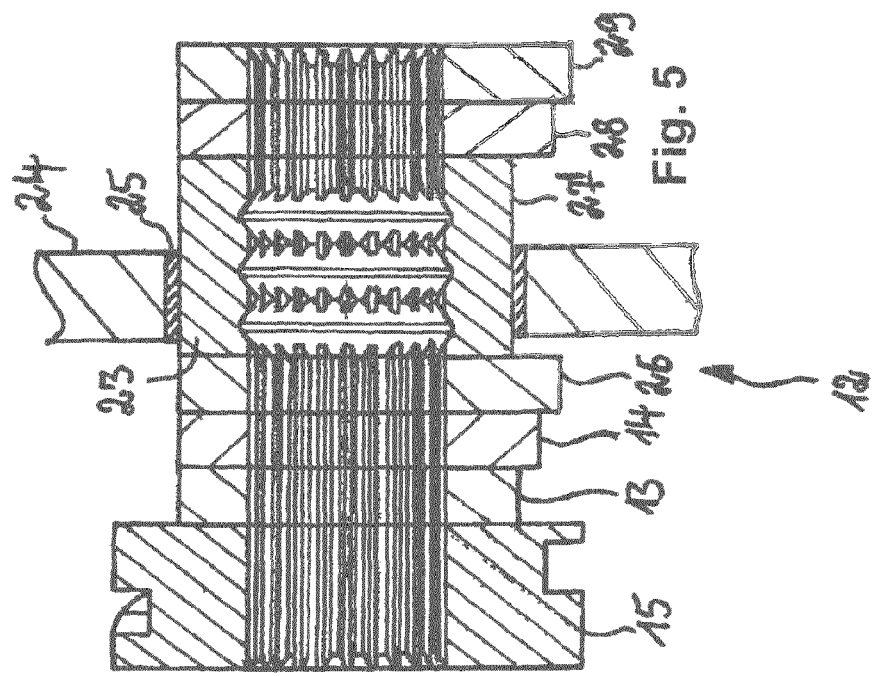
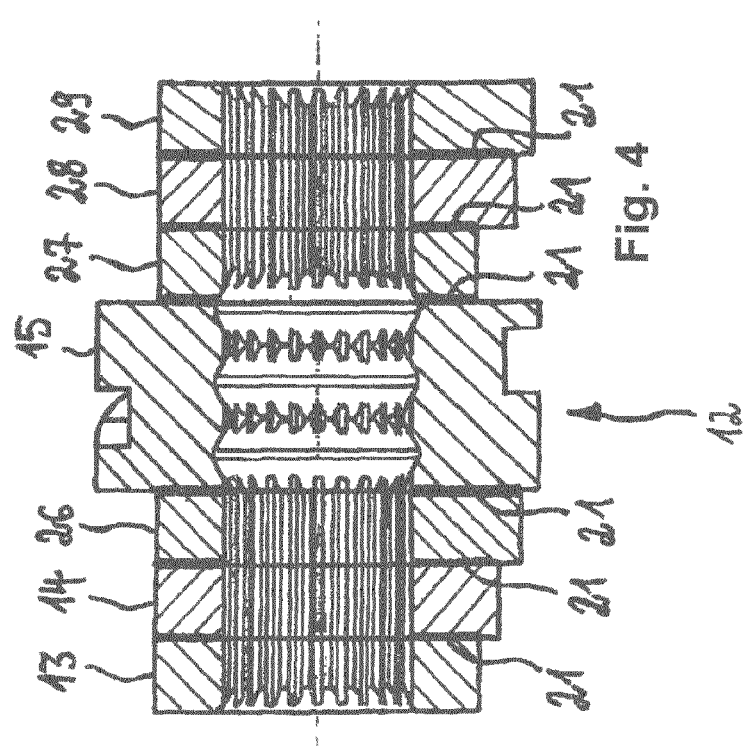

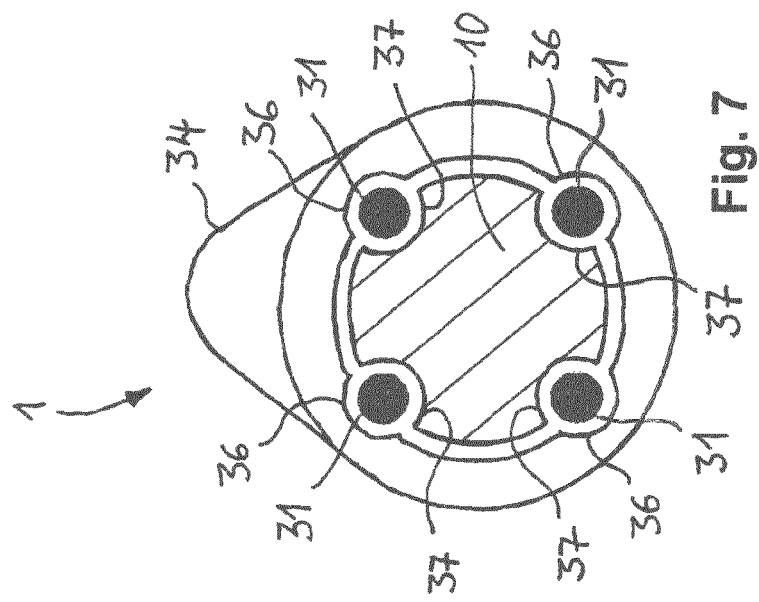
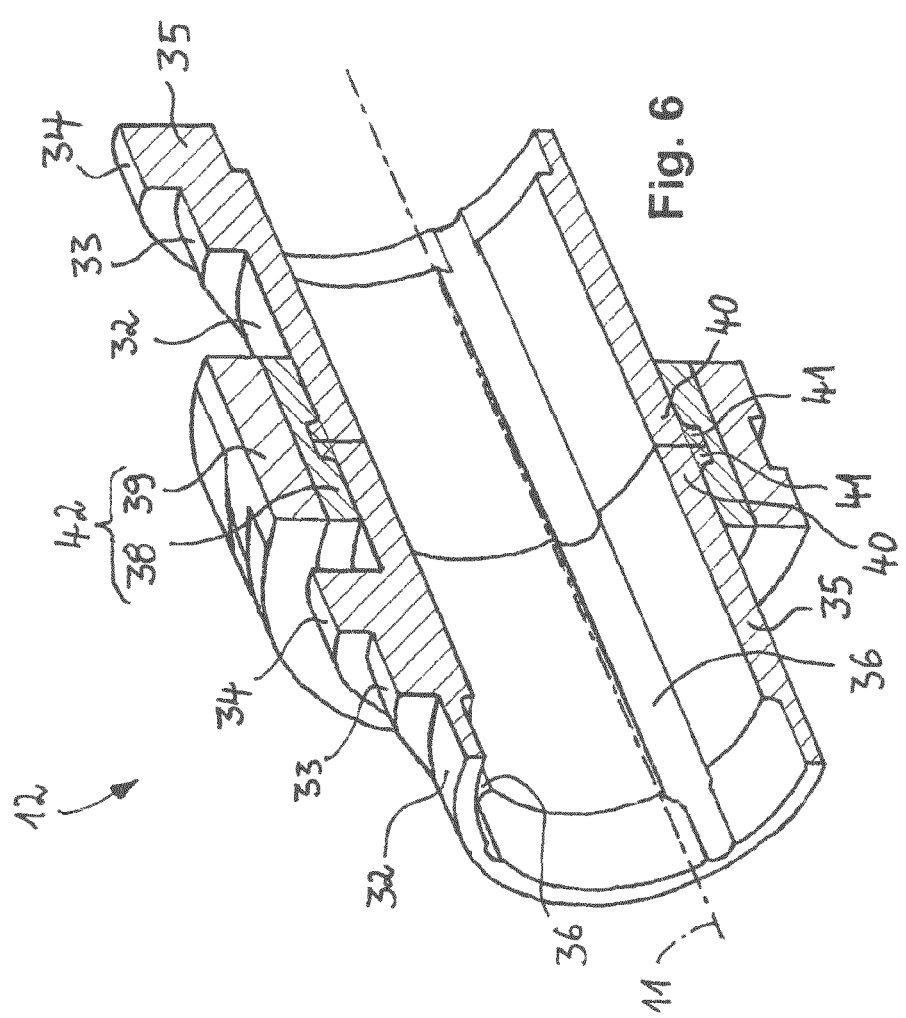

CAMSHAFT WITH AN AXIALLY DISPLACEABLE CAM PACK

BACKGROUND OF THE INVENTION

Field of the Invention

Such camshafts are used for internal combustion engines, which can be operated with an adjustable valve lift or with adjustable valve control times. The valves of the internal combustion engine are controlled by means of cam packs, which are disposed axially displaceable on the rotating carrier shaft. The valves can be controlled with different cams by the axial displacement of the cam pack on the carrier shaft, wherein the different cams can have different cam shapes. The cam lobes can be more or less geometrically pronounced or the position of the cam lobes can be varied relative to one another in the circumferential direction. Cams are also known that are constituted as zero-lift cams.

Cam packs comprise a plurality of cams, wherein at least one adjusting member is a component of the cam pack, by means of which the axial displacement is introduced into the cam pack.

There is known from DE 10 2009 022 657 A1 a camshaft with a carrier shaft, which can be mounted rotatably in the shaft axis in order to be operated in an internal combustion engine. Disposed on the carrier shaft is a cam pack, which is constituted for example by four cams. The cam pack comprises a carrier tube, which is disposed axially displaceable on the carrier shaft by means of an inner toothing system and an outer toothing system, so that the rotary motion of the carrier shaft is transmitted via a geometrical form-fit connection to the carrier tube. A plurality of cams is disposed on the carrier tube, so that the cam pack comprises four cams with two different cam contours. For the axial displacement of the cam pack, the carrier tube comprises axial stops, in which curved paths are introduced on the external periphery, said curved paths being able to cooperate with a transmission element.

DE 10 2004 011 586 A1 shows a further camshaft with a carrier shaft, and a carrier tube is shown which is constituted in one piece with a plurality of cams. The carrier tube comprises an inner toothing system, which engages with an outer toothing system of the carrier shaft in order to dispose the cam pack in an axially displaceable manner on the carrier shaft, and at the same time to produce a rotary transmission of the carrier shaft to the cam pack by means of a geometrical form-fit connection. The carrier tube comprises a bearing element between the cam contours in order to mount the cam pack rotatably in a bearing block, which can for example be a component of the cylinder head.

The camshafts according to the prior art disadvantageously comprise cam packs which necessitate a carrier tube in an assembled variant in order to combine various control elements and adjusting members with a cam pack, or which have to be produced in solid form. The carrier tube serves for the mounting on the carrier shaft and comprises the necessary inner toothing system which can engage with the outer toothing system on the carrier shaft. Disadvantageously, an expensive design arises due to the use of a carrier tube for mounting the cams and adjusting members, and the cams have to be disposed with a necessary jointing technique on the carrier tube. If the carrier tube and the cams and also, for example, the adjusting member are constituted as a whole in one piece, a component arises which is expensive to produce and on which a large number of processing operations have to be carried out. However, it is technically advantageous to be able to carry out individually both the machining and heat treatment of various elements of the cam pack.

BRIEF SUMMARY OF THE INVENTION.

The object of the present invention consists in providing a camshaft with a cam pack, which overcomes the aforementioned drawbacks of the prior art and has a simple structure, wherein the various elements of the cam pack can also be machined and heat-treated individually.

This object is solved proceeding from a camshaft with a carrier shaft which can be mounted for rotation along a shaft axis and at least one cam pack axially displaceably disposed on the carrier shaft. The cam pack includes at least two cams and at least one adjusting member for axial adjustment of the cam pack. The cams and the at least one adjusting member are connected to one another in an axially adjacent configuration and can be mounted axially displaceably as a composite structure in a direct configuration on the carrier shaft by a rolling element guide with rolling elements. Advantageous developments of the invention are given in the dependent claims.

The invention includes the technical teaching that the cams and the at least one adjusting member are connected to one another in an axially adjacent arrangement and can be mounted axially displaceable as a composite structure in a direct arrangement on the carrier shaft by means of a rolling element guide with rolling elements.

The invention proceeds from the idea of connecting the individual control elements of the cam pack directly to one another in order to constitute the cam pack without the use of a carrier tube. As a result of the direct connection of the cams and of the at least one adjusting member to the cams disposed adjacent to the latter, in the general idea of the invention also each element participating in a cam pack, the use of a carrier tube becomes unnecessary, and the cams and the at least one adjusting member can be disposed axially displaceable directly on the carrier shaft by means of the rolling element guide with the rolling elements. As a result of the direct connection of the cams to one another and of the adjusting member to the cams disposed adjacent to the latter, a composite structure of individual elements is created which can be machined individually before being connected jointly to one another. After the composite structure comprising the cams and the adjusting member has being created, the latter can be disposed directly on the carrier shaft without further use of a carrier tube or any other element.

The invention offers the particular advantage of constituting the cams and the adjusting member with a rolling element guide which communicates with the carrier shaft and the composite structure thus formed can be disposed in an axially movable and rotation-transmitting manner on the carrier shaft. As a further advantage, it is possible for example for only outer elements, for example a first outer cam and a mutually opposite second outer cam, to be constituted with a with a rolling element guide. The advantage is thus obtained that only two elements of the cam pack have to be constituted with a rolling element guide.

As a further advantage, at least one latching groove can be introduced into at least one of the cams, but preferably in the adjusting member, said latching groove being able to cooperate with a latching means for the axial latching of the cam pack, said latching means being disposed in the carrier shaft. The latching means can for example be a spring-loaded ball, which is pressed into the latching grooves. Defined axial positions of the cam pack can thus be defined by the axial adjustment, wherein the number of latching grooves preferably corresponds to the number of cams of differing cam contour. The latching grooves can be introduced particular advantageously into elements of the cam pack that are not constituted with a rolling element guide.

The cams and the adjusting member can be connected to one another at least over partial regions of their respective end faces. The end faces can be formed by plane faces, with which the shaft axis forms a surface normal. Once the cams and the adjusting member are brought flat one against the other in an axially adjacent arrangement, the connection can be made between the cams and/or the adjusting member. The connections can be constituted particularly advantageously as firmly bonded connections.

The firmly bonded connections between the cams and the at least one adjusting member and the cams adjacent thereto can be carried out by means of weld joints, and weld joints can be disposed for example on the outer periphery and/or on the inner periphery. The weld joints can be produced for example with a laser beam welding method or with an electron beam welding method, in order to minimize the thermally influenced material zone in the cams and/or in the adjusting member. Furthermore, the thermal distortion of the pack arrangement of the cam pack can be minimized by these welding methods. The weld joint can be produced particularly advantageously with the formation of a vapour capillary, in order to produce a particularly deep weld between the end faces of the cams and/or the adjusting member, so that the weld joint is capable of withstanding particularly high mechanical loads.

According to a possible embodiment of the invention, the firmly bonded connections between the cams and the at least one adjusting member can be carried out by means of solder joints and/or adhesive joints. In principle, finish machining of the functional surfaces of the cams and/or the adjusting member can take place after the firmly bonded connections are have been produced between the cams and/or the adjusting member.

As a further advantage, the connections between the cams and/or the multiple cam element and the adjusting member to the cams disposed adjacent thereto can be constituted by at least one and preferably a plurality of tie rods distributed uniformly on the periphery of the cam pack, said tie rod or rods extending through the cams and/or the adjusting member. The tie rods can be constituted by threaded bolts or suchlike and can take up a tensile stress after arrangement in the cam pack. The cams and the adjusting member are consequently pressed axially against one another in order to form a mechanically loadable composite structure comprising the cams and the adjusting member. Alternatively, it is also conceivable to connect the cams to one another and the adjusting member to its adjacent cams by means of one or more rivet joints. As a further advantage, the cams and the adjusting member can for example be pinned together, or form-fit geometries can be provided on the end faces of the cams and the adjusting member in order then to pass the tie rods through the cams and the adjusting member and thus to place them under tensile stress.

As a further possible embodiment of the invention, the connections of the cams and of the at least one adjusting member to its adjacent cams can be constituted in each case by at least one jointing element acting in a form-fit manner which is preferably disposed on the cams and/or at least one adjusting member or is constituted between the end faces. The jointing elements acting in a form-fit manner can be constituted in one piece with the cams and/or the adjusting member or can even be moulded onto the latter. For example, threaded joints, bayonet joints, undercut joints or other joints can be provided between the cams and/or the adjusting member, or jointing elements such as slot nuts or suchlike are provided. In principle, any possible connection embodiment can be provided between the cams and/or the adjusting member in order to connect the latter to one another in a mechanically loadable manner. The connection of the cams and/or the adjusting member should preferably be able to be produced free from play, and the connection should maintain the rotational position of the elements around the common shaft axis.

According to a further advantageous embodiment, the cam pack can comprise at least one bearing element, which is preferably constituted for the formation of a zero-lift cam. A zero-lift cam comprises a cylindrical lateral surface, wherein the bearing element can have an axial width which enables both the bearing of the cam pack by means of the bearing element as well as the simultaneous active connection of the bearing element to a tappet of the valve control.

According to an advantageous development of the cam shaft and the cam pack according to the invention, at least two cams can constitute at least one single-part multiple cam element which is disposed axially adjacent to the adjusting member, there being introduced in the cams and/or in the multiple cam element at least one guide groove, in which at least one rolling element is guided. The provision of a multiple cam element with two or more cams has the advantage that the cams do not have to be connected to one another by, for example, a further bonding-type jointing method. The combination of a plurality of cams to form a multiple cam element is advantageous, for example, when the cams can be produced from a uniform material and for example in a common mechanical chucking for the machining. In order to create a guide for the rolling elements of the rolling element guide, at least one guide groove in which the rolling elements are guided can be introduced in the through-bore, which is introduced on the inside in the multiple cam element or in individual cams. The rolling element guide and in particular the guide groove can be constituted parallel to the shaft axis or in a helical form around the shaft axis. The multiple cam element can for example be connected to the adjusting member, wherein firm bonding methods described above can be used for the connection. In particular, an adjusting member can be provided, and a first multiple cam element can be disposed on a first side of the adjusting member and a further multiple cam element can be disposed on an opposite, second side of the adjusting member in a common shaft axis.

As a further advantage, at least one guide groove, in which the at least one rolling element is guided, can be introduced in the carrier shaft, so that, by means of the rolling element and the guide grooves, the cam pack is guided axially and secured non-rotatably against the carrier shaft. The arrangement of a rolling element-mounted linear guide arises as a result of the two guide grooves and the rolling elements accommodated therein, wherein a plurality of guide grooves can be introduced distributed on the periphery of the through-bore in the multiple cam element, in the cam or cams and/or in the adjusting member, said guide grooves being able to communicate with a corresponding number of guide grooves on the carrier shaft.

According to an advantageous development of invention, provision can be made such that the connection at least between the cams and in particular the multiple cam element and the adjusting member is constituted by means of an integrally cast body, wherein the material of the integrally cast body comprises aluminum, magnesium or plastic and is integrally cast in particular in an injection moulding process or in a die-casting process. The integrally moulded body can be integrally moulded, in particular integrally cast, integrally injected or integrally cast in the die-casting process, between the multiple cam element and the adjusting member, so that a connection arises between the multiple cam element and the adjusting member.

According to a further advantageous embodiment, the adjusting member can be constituted at least in two parts, wherein a first part of the adjusting member is constituted by a control contour element and a second part of the adjusting member is constituted by the integrally cast body. Introduced in the control contour element is a control path, which cooperates with an external element in order to displace the cam pack axially along the shaft axis on the carrier shaft.

Furthermore, provision can be made such that, with the arrangement of two multiple cam elements on opposite sides of the adjusting member, respective jointing sections of the multiple cam elements point towards one another, said jointing sections being able to be cast with the adjusting member and in particular with the control contour element by means of the integrally cast body. In particular, the material of the integrally moulded body fills the radial gap between the jointing section of the multiple cam element and the inner side of the control contour element. The integrally cast body can be constituted wider in the direction of the shaft axis than the control contour element, so that the latter is embedded in the integrally moulded body and is thus accommodated by the latter. At the same time, a mechanically loadable connection between the control contour element and the multiple cam element arises as a result of the integrally cast body, so that the integrally moulded body forms both a part of the adjusting member and a means for connecting the adjusting member to the at least one multiple cam element. In this way, the integrally moulded body can also form a part of the adjusting member, and can also connect the control contour element to the cam body.

A form-fit shoulder can be disposed on the jointing section of the multiple cam element, so that a form-fit connection between the adjusting member and the multiple cam element is formed with the integrally cast body at least in the direction of the shaft axis. The form-fit shoulder can for example constitute a collar at the end of the jointing section of the multiple cam element, which is surrounded by the integrally cast body.

The invention further relates to a cam pack comprising at least two cams and at least one adjusting member for the axial adjustment of the cam pack on a carrier shaft, wherein the cams and the at least one adjusting member are connected to one another in an axially adjacent arrangement and are constituted as a composite structure for direct arrangement on the carrier shaft. The advantages and embodiments of the aforementioned camshaft with a corresponding cam pack are also taken into account for the generic cam pack.

The invention further relates to a method for producing a camshaft with a carrier shaft which can be mounted rotatably in a shaft axis, wherein at least one cam pack is disposed axially displaceable on the carrier shaft and wherein the cam pack comprises at least two cams and at least one adjusting member for the axial adjustment of the cam pack, wherein according to the invention the method comprises at least the steps of the mutual jointing of the cams and of the at least one adjusting member and the cams disposed adjacent to the latter in an axially adjacent arrangement and the direct arrangement of the composite structure on the carrier shaft by means of a rolling element guide with rolling elements.

The method can further comprise the introduction of an inner toothing system or a guide groove into the cams and/or into the adjusting member in order to engage in an axially displaceable manner with an outer toothing system on the carrier shaft. The inner toothing system is introduced directly into the material of the cams and/or of the adjusting member.

According to a further method step, there is introduced into at least one cam and/or into the adjusting member at least one latching groove, which can cooperate with a latching means, which is disposed in the carrier shaft, for the axial latching of the cam pack.

According to a possible embodiment of the method according to the invention, the inner toothing system can be introduced in each case individually into the cams and into the adjusting member, the cams and the adjusting member only being mutually jointed subsequently in an axially adjacent arrangement.

Alternatively, the cams, the multiple cam element and/or the adjusting member can be mutually jointed in an axially adjacent arrangement, the inner toothing system or the guide groove only then being introduced into the cams, the multiple cam element and/or into the adjusting member. In the same way, the at least one latching groove can be introduced before or after the jointing of the cams and the adjusting member with one another.

BRIEF DESCRIPTION OF THE SEVERAL VIEWS OF THE DRAWING

Further features improving the invention are represented in greater detail below with the aid of the figures, together with the description of preferred examples of embodiment of the invention. In the figures:

FIG. 1 shows a cross-sectional view through a camshaft with a cam pack, which is constituted with the features of the present invention, FIG. 2 shows a cross-sectional view of a cam pack according to a first example of embodiment for the formation of the connections between the cams and the adjusting member, FIG. 3 shows a cross-sectional view of a cam pack according to a second example of embodiment for the formation of the connections between the cams and the adjusting member, FIG. 4 shows a cross-sectional view of a cam pack according to a further example of embodiment for the formation of the connections between the cams and the adjusting member, FIG. 5 shows a further example of embodiment of a cam pack, which comprises a bearing element for the mounting in a bearing, FIG. 6 shows an example of embodiment of a cam pack which shows the features of the invention, FIG. 7 shows the example of embodiment of the cam pack according to FIG. 6 with a rolling element guide in a cross-sectional view and FIG. 8 shows the example of embodiment of the cam pack according to FIG. 6 in an exploded view,

DESCRIPTION OF THE INVENTION

Figure 8:
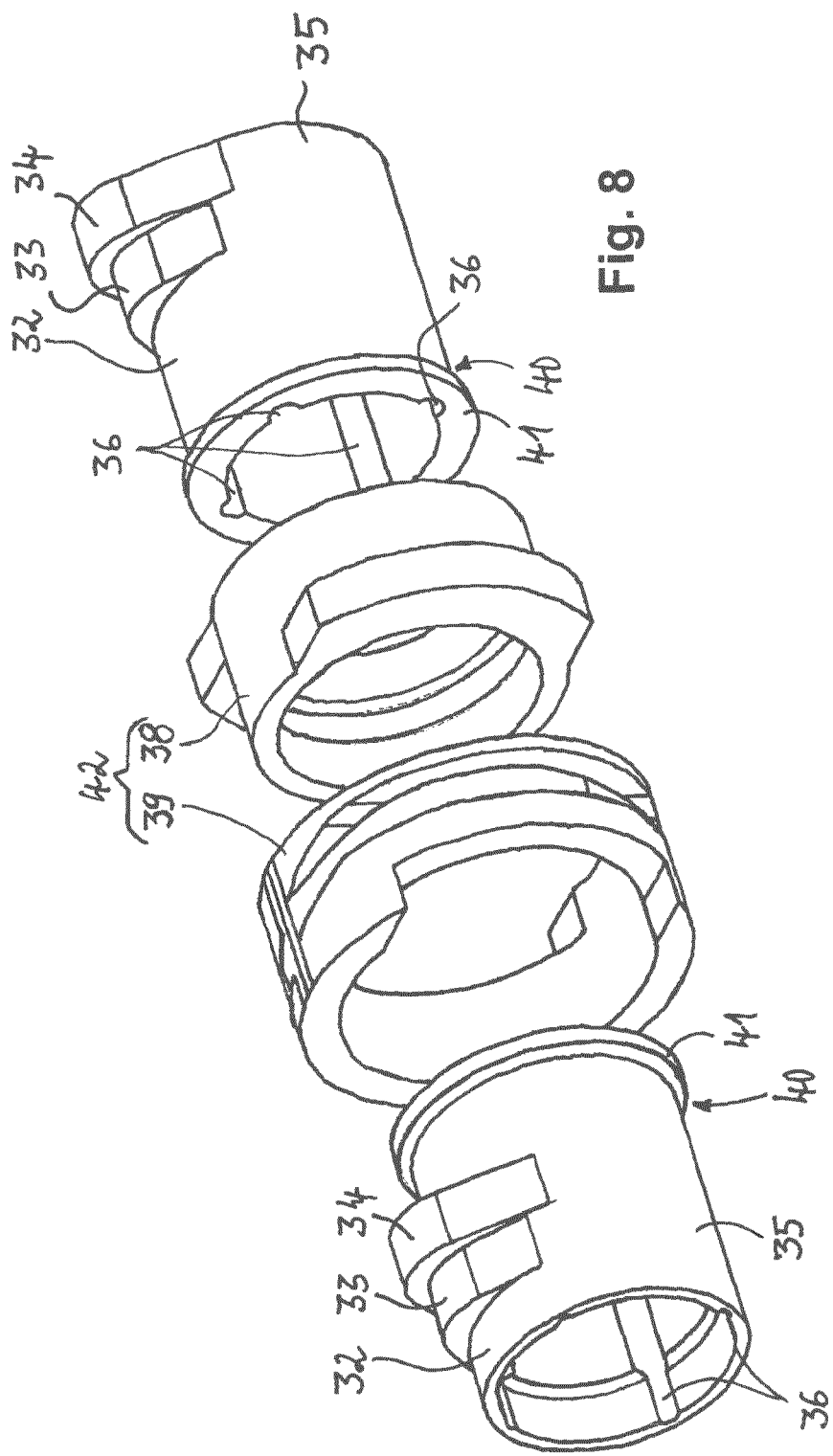

FIG. 1 shows an example of embodiment of a camshaft 1 with a cam pack 12, which is constituted with the features of the present invention. Camshaft 1 comprises a carrier shaft 10, which is shown interrupted in the seating region of cam pack 12. Carrier shaft 10 can be mounted rotatably in a shaft axis 11, for example in the cylinder head of an internal combustion engine.

Cam pack 12 comprises for example six cams 13, 14, 26, 27, 28 and 29, wherein an adjusting member 15 is provided, and a groove guide 30 is introduced in adjusting member 15 on the outer periphery of the adjusting member 15. Cams 13, 14 and 26 are located on a first side of adjusting member 15, and cams 27, 28 and 29 are located on an opposite, second side of adjusting member 15. A through-bore, through which carrier shaft 10 is passed, extends through cams 13, 14, 26, 27, 28, 29 and through adjusting member 15. An inner toothing system 16 is introduced in this through-bore formed by the individual components of cam pack 12, said inner toothing system engaging with an outer toothing system 17 on carrier shaft 10 in an axially displaceable and torque-transmitting manner. Outer toothing system 17 of carrier shaft 10 is constituted wider in the direction of shaft axis 11 than the width of cam pack 12, and cam pack 12 can be adjusted axially in the direction of the shaft axis, whereby an adjusting element is guided in groove guide 30 of adjusting member 15. As a result of the form-fit connection of inner toothing system 16 and outer toothing system 17, a rotary motion of the carrier shaft 10 is at the same time transmitted to cam pack 12.

Cams 13, 14, 26, 27, 28, 29 and adjusting member 15 are connected to one another in an axially adjacent arrangement with one another, so that, as a result of the connection of these components of cam pack 12 via their respective end faces constituted in the axial direction, a composite structure is created which forms cam pack 12. According to the invention, this does not require a carrier tube on which the individual components such as cams 13, 14, 26, 27, 28, 29 and adjusting member 15 have to be disposed. Inner toothing system 16 and latching grooves 18 can thus be introduced directly into cams 13, 14, 26, 27, 28, 29 and into adjusting member 15, wherein for example three latching grooves 18 are introduced on the inside into adjusting member 15, which are able to cooperate with a latching means for the axial latching of cam pack 12, said latching means being disposed in carrier shaft 10 in a manner not shown in detail.

Cams 13, 14, 26, 27, 28, 29 each have different cam contours, for example cams 13, 14, 26, 27, 28, 29 can have different cam lobes or the cam lobes are constituted at different angles around the circumference. As a result of the axial adjustability of cam pack 12, tappets having a fixed axial position can cooperate with different cams 13, 14, 26 or 27, 28, 29, in order for example to change the valve lift, but also for example to change the valve control times.

FIG. 2 shows a first example of embodiment for the formation of the composite structure of cams 13, 14, 26, 27, 28, 29 and adjusting member 15. The connection is constituted by tie rods 22, and by way of example two tie rods 22 are represented over the periphery of cam pack 12, wherein in particular more than two tie rods 22 can be provided, which are disposed uniformly distributed on the periphery of cam pack 12. Tie rods 22 extend parallel to shaft axis 11 through cams 13, 14, 26, 27, 28, 29 and adjusting member 15 and are placed under axial tensile stress. The components of cam pack 12 are thus pressed against one another at the end faces in order to form a mechanically loadable composite structure. Tie rods 22 can be constituted as screw elements or as dowel pins, in order to introduce a tensile stress into tie rods 22.

FIG. 3 shows a further example of embodiment for the formation of cam pack 12, wherein the connections between cams 13, 14, 26, 27, 28, 29 and adjusting member 15 are constituted by weld joints 19, 20. Weld joints 19 are constituted as weld joints on the outer periphery and weld joints 20 are constituted as weld joints on the inner periphery. Weld joints 19 and 20 constituted on the outer periphery and on the inner periphery are shown merely by way of example, wherein for example only weld joints 20 on the inner periphery may be sufficient to form a mechanically loadable composite structure of the components of cam pack 12. Weld joints 19 and 20 can be produced for example by laser beam welding procedures or by electron beam welding procedures, in order to minimize the thermal effect on cams 13, 14, 26, 27, 28, 29 and adjusting member 15.

FIG. 4 shows a further example of embodiment for the formation of cam pack 12, wherein cams 13, 14, 26, 27, 28, 29 are connected to one another and adjusting member 15 to adjacent cams 26, 27 by solder joints 21. Solder joints 21 can be prepared for example by soldering foils, which are disposed between the individual components of cam pack 12 and, after the arrangement of cams 13, 14, 26, 27, 28, 29 and adjusting member 15 in an axially adjacent arrangement with respect to one another, cam pack 12 thus prepared can be brought to the solder melting temperature in order to finish solder joints 21. As an alternative to shown solder joints 21, adhesive joints can be provided between the components of cam pack 12.

Finally, FIG. 5 shows a further embodiment of a cam pack 12 with an adjusting member 15 and cams 13, 14, 26, 27', 28, 29, wherein cam 27' is also constituted as a bearing element 23. The cam 27' is constituted as a zero-lift cam and has a cylindrical outer circumference. Besides the tapping—not shown in detail—by means of a tappet for the valve control, cam pack 12 is mounted in a bearing block 24, into which a bearing 25 is introduced. Cam 27' thus performs both as a zero-lift function for the valve control as well as the function for the bearing of cam pack 12. The connection between the components of cam pack 12 can be constituted according to the example of embodiment in FIG. 2, in FIG. 3 or in FIG. 4.

As a result, a cam pack 12 is created which can be constituted without the use of a carrier tube. Furthermore, the possibility remains of feeding the different components of cam pack 12 in each case individually to mechanical and/or thermal processing steps, the components only then being connected to one another to form a cam pack 12.

Inner toothing system 16, which is introduced into cams 13, 14, 26, 27, 28, 29 and into adjusting member 15, can be introduced individually into the respective components before the creation of the jointing connections or inner toothing system 16 is introduced into cam pack 12 when the jointing connections between the individual components have already been created.

FIG. 6 shows an example of embodiment of a cam pack 12 with the features of the present invention. Cam pack 12 has a structure comprising two multiple cam elements 35 and an adjusting member 42. Each of multiple cam elements 35 comprises cams 32, 33 and 34, wherein cams 32 are constituted as zero-lift cams. The two multiple cam elements 35 are disposed with their end faces adjacent to one another along a common shaft axis 11. According to the invention, multiple cam elements 35 comprise on the inside guide grooves 36, in which rolling elements can be guided. Guide grooves 36 extend over the entire length of cam pack 12 along shaft axis 11.

Adjusting member 42 is constituted by a control contour element 39 made of a metallic material, which has an approximately ring-shaped embodiment. Control contour element 39 surrounds jointing sections 40 integrally moulded on multiple cam elements 35, with which jointing sections multiple cam elements 35 lie adjacent to one another, so that jointing sections 40 extend roughly on the inside into control contour element 39. To complete adjusting element 42, the radial region between ring-shaped control contour element 39 and jointing sections 40 is filled with the material of integrally cast body 38. The filling of the material can take place in an original moulding tool, into which multiple cam elements 35 and control contour element 39 are introduced beforehand. The original moulding tool can comprise a tool mould which defines the free lateral surfaces of integrally cast body 38.

After injection or casting of the material for the formation of integrally cast body 38, a mechanically loadable, firm composite structure arises with multiple cam elements 35 and control contour element 39, by means of which cam pack 12 is formed. In order to create a form-fit connection between jointing sections 40 of multiple cam elements 35 and the material of integrally cast body 38, collar-shaped form-fit shoulders 41 are integrally moulded at the edge-side end of jointing sections 40, so that a geometrical form-fit connection between jointing sections 40 and integrally cast body 38 is formed in the axial direction of shaft axis 11.

The representation shows, merely by way of example, the connection between an adjusting member 42 and two multiple cam elements 35. In this way, a connection between an adjusting member 15 and one or more cams 13, 14, 26, 27, 28, 29 can also be created with an integrally cast body 38, as they are represented for example in FIG. 1.

FIG. 7 shows a cross-sectional view of a cam shaft 1 with a cam pack 12 disposed on a carrier shaft 10, said cam pack being represented by way of example with a cam 34 which can be a component of a multiple cam element not specified in detail. Guide grooves 36 are introduced on the inside of cam 34, a total of four guide grooves 36 being shown, by way of example, distributed on the periphery. Corresponding to this, carrier shaft 10 comprises four guide grooves 37, and rolling elements 31 are accommodated both on the inside in guide grooves 37 and on the outside in guide grooves 36. Rolling elements 31 thus form, together with guide grooves 36 and 37, the rolling element guide according to the invention, in order to displace axially cam pack 12 of camshaft 1 in the direction of shaft axis 11 and at the same time to dispose the latter in a non-rotatable manner.

FIG. 8 shows, in an exploded representation, a cam pack 12 with two multiple cam elements 35 and a control contour element 39, which together with a part of an integrally cast body 38 forms an adjusting member 42. Integrally cast body 38 is represented detached, as a result of which the developing geometrical shape of body 38 is clearly shown, without integrally cast body 38 being assembled as an individual part.

The example of embodiment shows multiple cam elements 35 with in each case four inner guide grooves 36 and cams 32, 33 and 34, which are located on the outer periphery of multiple cam elements 35, wherein by way of example cam 32 is constituted as a zero-lift cam.

Located at the end of jointing sections 40, which are integrally moulded on multiple cam elements 35 and point towards one another, are form-fit shoulders 41, which together with integrally cast body 38 form a geometrical form-fit connection. According to the example of embodiment shown, jointing sections 40 merge seamlessly into one another from cam 32 constituted as a zero-lift cam, so that jointing section 40 merely forms an axial extension of cam 32.

The invention is not limited in its implementation to the aforementioned preferred examples of embodiment. On the contrary, a number of variants are conceivable, which make use of the presented solution even with fundamentally different embodiments. All the features and/or advantages emerging from the claims, the description or the drawings, including structural details or spatial arrangements, may be essential to the invention both in themselves as well as in the most varied combinations.

LIST OF REFERENCE NUMBERS

1 camshaft
10 carrier shaft
11 shaft axis
12 cam pack
13 cam, 13a end face
14 cam, 14a end face
15 adjusting member, 15a end face
16 inner toothing system
17 outer toothing system
18 latching groove
19 weld joint on the outer periphery
20 weld joint on the inner periphery
21 solder joint
22 tie rod
23 bearing element
24 bearing block
25 bearing
26 cam
27 cam
27' cam
28 cam
29 cam
30 groove guide
31 rolling element
32 cam
33 cam
34 cam
35 multiple cam element
36 guide groove
37 guide groove
38 integrally cast body
39 control contour element
40 jointing section
41 form-fit shoulder
42 adjusting member

The invention claimed is:

1. A camshaft, comprising:
a carrier shaft configured to be mounted for rotation along a shaft axis;
at least one cam pack configured to be axially displaced on said carrier shaft, said at least one cam pack including at least two cams and at least one adjusting member configured to axially adjust said at least one cam pack;
said cams and said at least one adjusting member connected to one another in an axially adjacent configuration as a composite structure; and
a rolling element guide with rolling elements configured to mount said composite structure for axially displacement in a direct configuration on said carrier shaft;
said at least two cams forming at least one single-part multiple cam element disposed axially adjacent said at least one adjusting member; and
said multiple cam element having at least one axially-directed guide groove formed therein in which at least one of said rolling elements is guided for permitting axial displacement and preventing circumferential rotation of said cam pack relative to said carrier shaft.

2. The camshaft according to claim 1, wherein said carrier shaft has at least one guide groove formed therein in which said at least one rolling element is guided, said at least one cam pack being guided axially by said at least one rolling element and said guide grooves and secured non-rotatably against said carrier shaft.

3. The camshaft according to claim 1, which further comprises an integrally cast body interconnecting at least said cams or said multiple cam element and said at least one adjusting member, said integrally cast body formed of an aluminum, magnesium or plastic material.

4. The camshaft according to claim 3, wherein said material is an injection-molded or die-cast material.

5. The camshaft according to claim 3, wherein said at least one adjusting member has at least two parts including a first part formed as a control contour element and a second part formed by said integrally cast body.

6. The camshaft according to claim 5, which further comprises a first multiple cam element disposed on a first side of said at least one adjusting member and a second multiple cam element disposed on an opposite, second side of said at least one adjusting member, said multiple cam elements including jointing sections pointing towards one another, said jointing sections being cast with said at least one adjusting member by said integrally cast body.

7. The camshaft according to claim 6, wherein said jointing sections are cast with said control contour element of said at least one adjusting member.

8. The camshaft according to claim 6, which further comprises form-locking shoulders disposed on said jointing sections and configured to form a form-locking connection between said at least one adjusting member and said multiple cam elements with said integrally cast body in direction of said shaft axis.

9. The camshaft according to claim 1, wherein said at least one cam pack includes at least one bearing element.

10. The camshaft according to claim 9, wherein said at least one bearing element is configured to form a zero-lift cam.

11. A cam pack, comprising:
at least two cams;
at least one adjusting member configured to axially adjust the cam pack on a carrier shaft;
said cams and said at least one adjusting member connected to one another in an axially adjacent configuration as a composite structure; and
a rolling element guide with rolling elements configured to mount said composite structure directly on the carrier shaft;
said at least two cams forming at least one single-part multiple cam element disposed axially adjacent said at least one adjusting member; and
said multiple cam element having at least one axially-directed guide groove formed therein in which at least one of said rolling elements is guided for permitting axial displacement and preventing circumferential rotation of said cam pack relative to said carrier shaft.

12. A method for producing a camshaft, the method comprising the following steps:
providing a carrier shaft configured to be mounted for rotation along a shaft axis;
providing at least one cam pack including at least two cams and at least one adjusting member configured to axially adjust the at least one cam pack, said at least two cams forming at least one single-part multiple cam element disposed axially adjacent said at least one adjusting member, and said multiple cam element having at least one axially-directed guide groove formed therein;
placing the at least one cam pack axially displaceably on the carrier shaft;
mutually joining the cams, the at least one adjusting member and a cam adjacent the at least one adjusting member in an axially adjacent configuration as a composite structure; and
directly mounting the composite structure on the carrier shaft using a rolling element guide with rolling elements; and
guiding at least one of the rolling elements in the at least one guide groove for permitting axial displacement and preventing circumferential rotation of the cam pack relative to the carrier shaft.

* * * * *